March 4, 1958      L. F. NOVAK      2,825,259
CARTRIDGE RESIZER
Filed Dec. 13, 1954      2 Sheets-Sheet 1
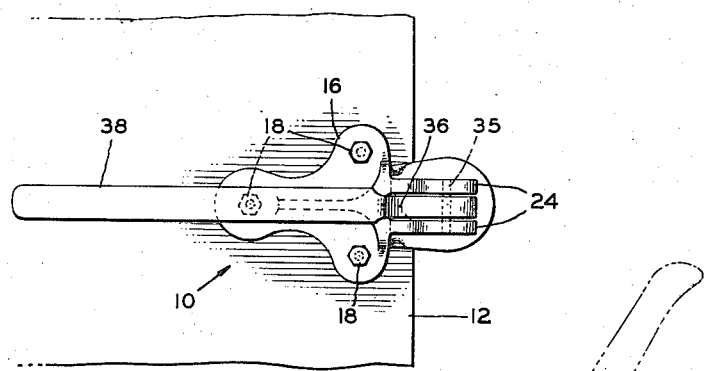
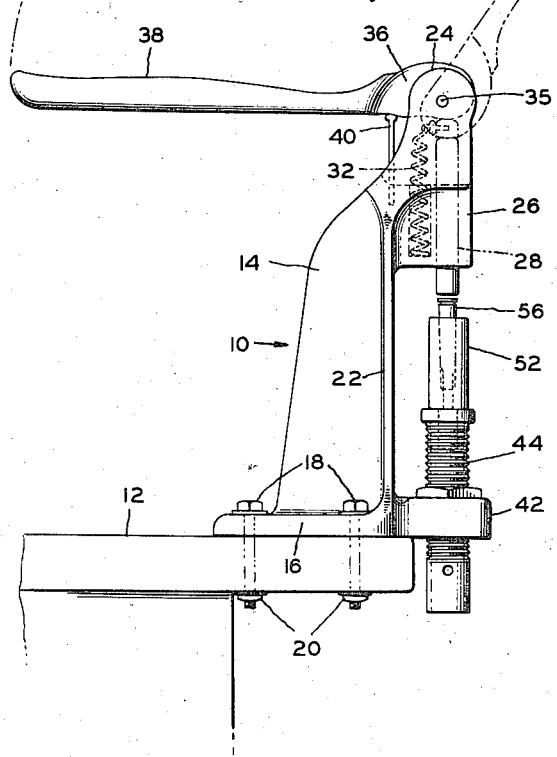
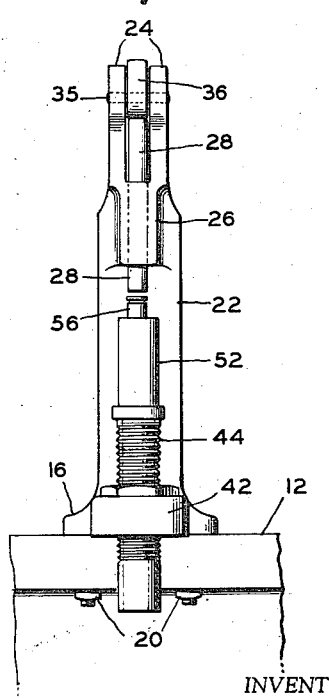
INVENTOR
Lewis F. Novak.
BY *Gustave Miller*
ATTORNEY March 4, 1958     L. F. NOVAK     2,825,259
CARTRIDGE RESIZER
Filed Dec. 13, 1954     2 Sheets-Sheet 2

INVENTOR
Lewis F. Novak.
ATTORNEY

United States Patent Office 2,825,259
Patented Mar. 4, 1958

2,825,259

CARTRIDGE RESIZER

Lewis F. Novak, Decorah, Iowa

Application December 13, 1954, Serial No. 474,878

1 Claim. (Cl. 86—23)

This invention relates to a device for resizing fired cartridge casings, and especially relates to a device for resizing fired cartridge casings before they are reloaded so that they will enter the gun chamber properly.

Heretofore, cartridge resizers of this general type have either been too complicated in structure or have not been capable of developing enough power to adequately resize a cartridge casing throughout its full length. Heretofore, the most frequently used method consisted in forcing the casing into a shaped die by means of a mallet or hammer. However, this method could not develop enough power since large cartridges, such as 30-06 or 300 magnum, often required a force of at least 150 pounds to properly force the cartridge casing into the die. On the other hand, the press type of tools heretofore used were far too complex and expensive. In addition, the pressure was often so great as to rupture the cartridge. Furthermore, it was difficult to remove the cartridge casing once it had been sized. Generally, the casing was pulled out of the die by gripping either the flanged rim on the casing or by gripping a special extracting groove on the casing. However, if the casing were too tightly wedged in the die, the gripping and pulling extractor would often either rip off the flange or dent the external surface of the casing to a point where it was useless for its purpose.

It is one object of the present invention to provide a resizing device which, although simple in design and consisting of relatively few parts, is nevertheless capable of exerting a great enough force on a cartridge casing to press it into a resizing die without damage to the casing.

Another object of the present invention is to provide a resizing device which is capable of extracting a resized cartridge casing from the resizing die without damage to the casing.

Another object of the present invention is to provide a resizing device that is capable of utilizing the common type of resizing die.

Another object of the present invention is to provide a resizing device which can be adjusted for the various types and sizes of cartridges.

Other objects of the present invention are to provide an improved resizing device of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of a device embodying the present invention.

Fig. 2 is a front elevational view of the device of Fig. 1.

Fig. 3 is a top plan view of the device of Fig. 1.

Figure 4:
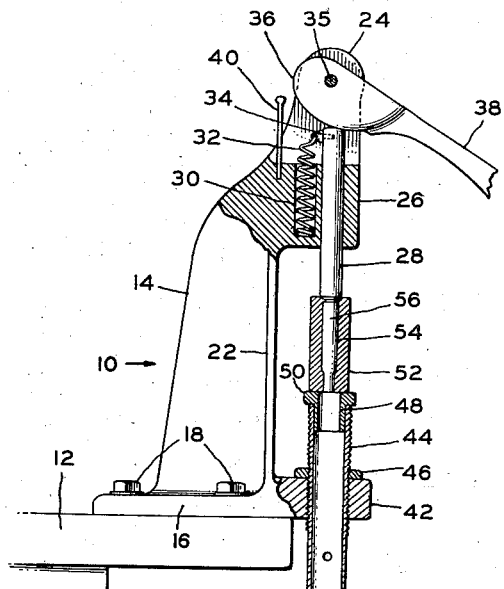
Fig. 4 is a side view of the device, similar to Fig. 1, but being partly in elevation and partly in section, and showing a cartridge case forced into the resizing die.

Referring now in greater detail to the drawings wherein similar reference characters refer to similar parts, there is shown a press generally designated 10, comprising a bench 12, a stand 14 having a horizontal flange 16, and bolts 18 securing the flange 16 to the base 12. Nuts 20 lock the bolts 18 in place. The horizontal flange 16 is integral with a vertical flange 22 which is provided at the top with a pivotal joint comprising a pair of upstanding ears 24. Integral with the ears 24 and depending therefrom is a sleeve housing 26, and slidably positioned within the sleeve housing is a plunger 28. At one side of the housing 26 is a recess 30 and in this recess is positioned a spring 32. The top of the spring is connected to the top of the plunger, as at 34, and acts to resiliently bias the plunger upwardly.

Pivotally connected between the ears 24, as by a pivot pin 35, is a cam 36. A handle 38 extends outwardly from the cam 36. The cam 36 is movable by the handle 38 from a position, such as shown in full line in Fig. 1, wherein the cam does not exert any pressure on the plunger, to a position, such as shown in Fig. 4, wherein the cam exerts a full downward pressure on the plunger. A stop 40 is provided on the standard 14 to limit the movement of the cam and cam handle toward the left, as viewed in Figs. 1 and 4.

Figure 5:
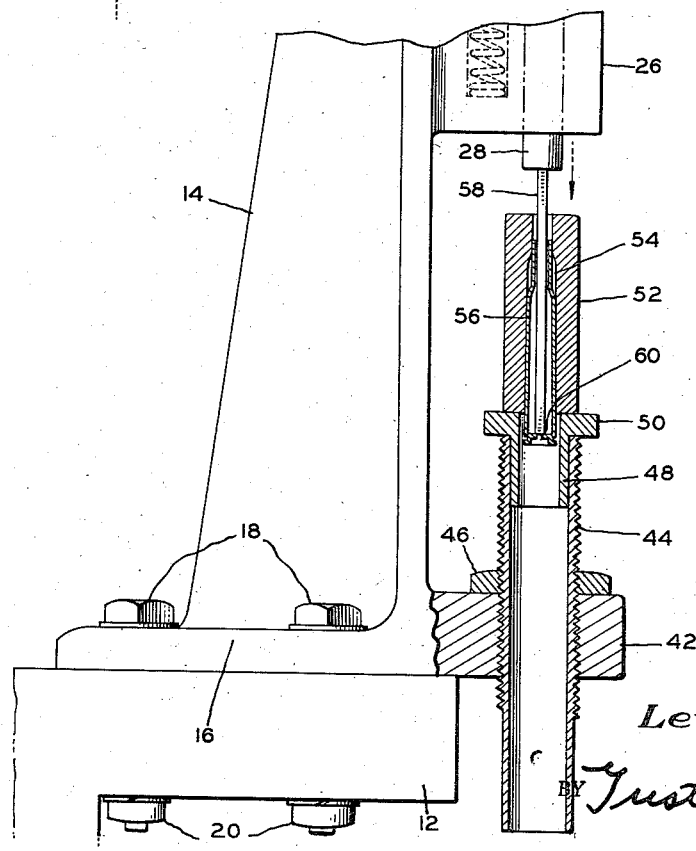
Fig. 5 is an enlarged fragmentary view, partly in elevation and partly in section, showing the cartridge case being removed from the die.

Extending laterally from the bottom portion of flange 22, adjacent the horizontal flange 16, is integrally provided a tubular base 42. A threaded opening is formed in the base 42, and in this opening is threadedly positioned an externally threaded sleeve 44. The sleeve 44 is vertically adjustable in the base 42 by means of the threaded connection. A lock nut 46 holds the sleeve 44 in adjusted position. A sleeve bushing 48 is press-fitted into the top of the sleeve 44. The bushing 48 is provided with a flange 50, the undersurface of which seats on the top rim of the sleeve 44, and the upper surface of which acts to support a die 52. The die 52 is of the ordinary type generally used in hand sizing operations and includes a central sizing bore 54 of the size and shape of the desired finally sized cartridge case. The die 52 is shown in its upright position in Fig. 4 where the cartridge case is being sized, while it is shown in reversed position in Fig. 5 where the cartridge case is being extracted.

In operation, when a cartridge case is to be sized, the die is set in the position of Fig. 4 and the cartridge case 56 is forced down into the opening 54 by the pressure of the cam 36 on the plunger 28 which bears on the rear end of the cartridge case. After the cartridge case has been forced into the opening 54 and thereby sized to shape, it is extracted from the die by reversing the die into the position shown in Fig. 5. An extracting rod 58 is inserted into the cartridge case so that one end bears on the base of the cartridge case, as at 60, while the other end bears against the plunger 28. As the handle 38 is moved to bring the cam into camming action on the plunger 28, the plunger is forced down, against the force of spring 32, to press against the rod 58. The end of the rod, bearing on the rear end of the cartridge case, forces the cartridge case out of the opening 54 until it is sufficiently loosened to drop through the bushing 48 and sleeve 44.

The sleeve 44 may be vertically adjusted in accordance with the length of the cartridge case. The sleeve, furthermore, may be used in either the position shown or in reversed position, depending on the length of the cartridge case. For long cartridges, the unthreaded end of the sleeve is preferably on the lower end, as shown, so that the sleeve may be threadedly adjusted, as low as necessary, while for short cartridges, the unthreaded end of the sleeve is generally positioned on the upper end so that the sleeve may be adjusted as high as necessary.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In a device of the character described, a stand having a horizontal flange, a vertical flange integral with said horizontal flange, a pair of ears integral with the top of said vertical flange, a sleeve housing depending below said ears, a plunger slidable within said sleeve housing, a vertical recess in said housing adjacent the sleeve in said housing, a compression spring in said recess, a connection between the top end of said spring and said plunger tending to bias the latter upwardly, a cam pivotally mounted between said ears, an operating handle integrally connected to said cam, downward movement of said handle rotating said cam to move said plunger downwardly, a stop on said stand limiting downward movement of said plunger, a tubular base integrally extending horizontally from said horizontal flange, said base having an internally threaded opening therein, an externally threaded sleeve adjustably positioned in said opening, a lock nut for holding said sleeve in adjusted position, a sleeve bushing force-fitted in the top of said sleeve, a flange on the top of said bushing, the underside of said flange seating on the top of said sleeve, a die adapted to rest on the outer surface of said flange, said die having a cartridge sizing base thereon, the arrangement being such that a cartridge seated in said die may be sized by downward pressure on said handle and consequent pressure on said cam and said rod.

References Cited in the file of this patent

UNITED STATES PATENTS

| 345,343 | Washburn | July 13, 1886 |
| 2,004,420 | Siebert et al. | June 11, 1935 |

FOREIGN PATENTS

| 581,495 | France | Sept. 29, 1924 |
| 1,012,256 | France | Apr. 9, 1952 |